May 27, 1969

D. W. COOPER ET AL 3,447,003

GENERATOR FOR A SPACE POWER SYSTEM

Filed March 2, 1967

INVENTORS
DALE W. COOPER
PERRY W. KUHNS

BY

ATTORNEYS

United States Patent Office 3,447,003
Patented May 27, 1969

3,447,003
GENERATOR FOR A SPACE POWER SYSTEM
Dale W. Cooper, Fairview Park, and Perry W. Kuhns, Parkview, Ohio, assignors to the United States of America as represented by the Administrator of the National Aeronautics and Space Administration
Filed Mar. 2, 1967, Ser. No. 621,098
Int. Cl. H02k 9/19
U.S. Cl. 310—54                               10 Claims

ABSTRACT OF THE DISCLOSURE

A space power generating system having a rotor in the form of a slotted armature of electrically insulating material. Each slot is filled with small diameter copper wires. Rotation of the armature moves these wires through the field of a fixed superconducting magnet which forms the stator.

Origin of the invention

Figure 1:
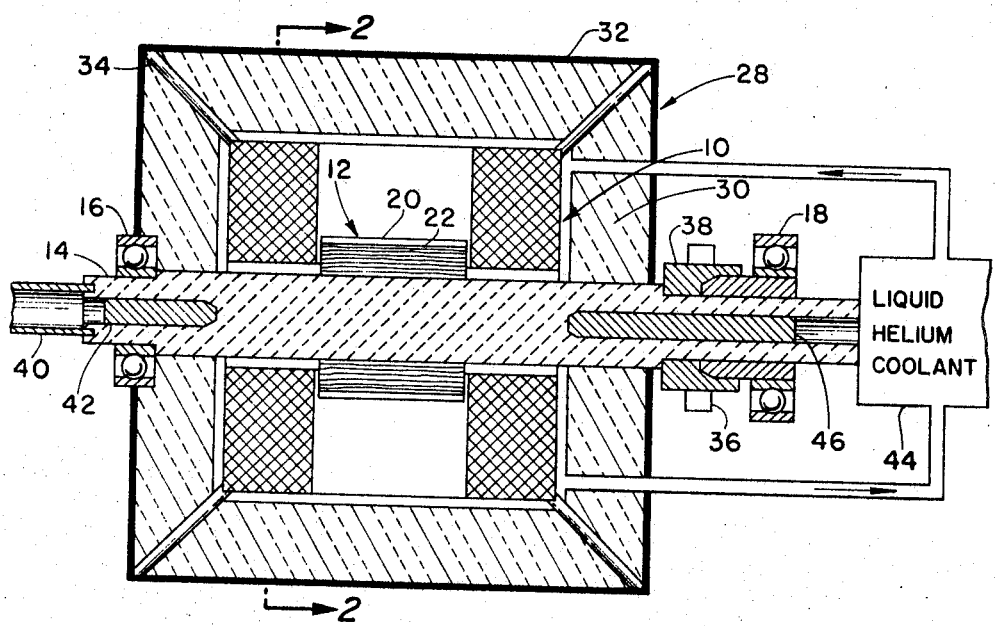

The invention decribed herein was made by employees of the United States Government and may be manufactured and used by or for the Government for governmental purposes without the payment of any royalties thereon or therefor.

Background of the invention

This invention relates to a superconducting magnet generator for producing a greater amount of electrical power for a given input power and having a smaller weight than a conventional generator. The invention is particularly directed to such a generator which is capable of being used in a space environment.

A vast amount of electrical power is required for certain space missions, such as those utilizing electric propulsion. Low weight and high efficiency are both mandatory for power rotating mechanical to electrical conversion systems for use in space. Salient pole alternators of the type used in power generating stations have been proposed for space applications because of their high efficiency and low weight. To reduce the weight even more cylindrical rotators have been substituted for the salient pole rotors in this type of alternator to produce higher speed generators. However, these devices utilize graphite brushes which exhibit excessive wear at high altitudes.

Brushless generators are proposed as a solution to the brush wear problem. These brushless machines have weights about twice those of the cylindrical rotor alternator which operate at the same speed. Also, brushless generators utilize solid rotor construction which produces greater hysteresis and eddy current losses with decreased efficiency.

These space requirements have been met, and the problems of the prior art devices have been solved with the superconducting generator constructed in accordance with the present invention. This generator has a superconducting field as the stator, and its rotor is capable of operating at very high temperatures. A larger cross section of armature conductors can be utilized because no magnetic materials are used in the rotor.

It is, therefore, an object of the present invention to provide a space power generating device which is light in weight and has increased efficiency.

Another object of the invention is to provide an improved electrical generator for an electric propulsion space mission having no magnetic material in its rotor.

A further object of the invention is to provide a space power generator having a nonmagnetic rotor which utilizes armature conductors having large cross sections.

These and other objects of the invention will be apparent from the specification which follows and from the drawings wherein like numerals are used throughout to identify like parts.

Figure 2:
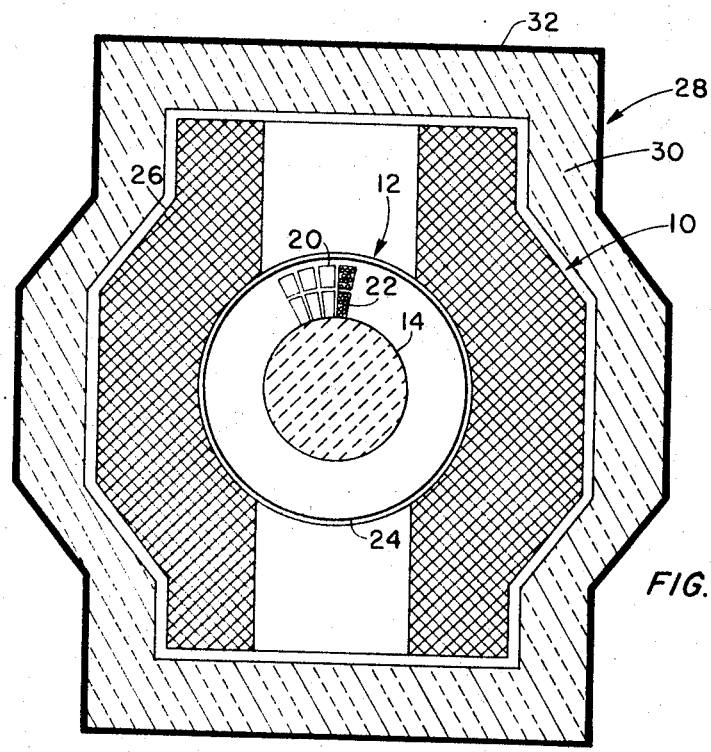

In the drawings,

FIG. 1 is an axial section view of an electric generator constructed in accordance with the invention, and FIG. 2 is an enlarged section view taken along the line 2—2 in FIG. 1.

A power generating device embodying the feature of the present invention is shown in the drawings. This generator has a stator 10 around a rotor 12 which is mounted on a shaft 14. A pair of spaced bearings 16 and 18 mount the shaft 14 for rotation about its normal axis.

In an ordinary A.C. alternator, the magnetic field is the rotor, but in a superconducting magnet generator many problems arise if the rotor is superconducting. Heat from the driving source, such as a turbine, is conducted to the cryogenic rotor through the support shaft. Another problem is the complicated structure required for a rotating refrigeration and insulation system.

As shown in the drawings, the structure of the present invention differs from the usual alternator in that, like a D.C. generator, the stator 10 is the field while the rotor 12 is the armature. This superconducting magnet generator is similar to a salient pole alternator with brushes, and by applying superconductivity to this type of generator both weight conservation and high efficiency are realized.

For superconducting magnets to be useful a high magnetic field is generally desired. Such a field should be above about 10 kilogauss where magnetic materials saturate. Thus, the present invention is contrary to conventional generators in that it has no magnetic materials.

The rotor 12 is of an electrical insulating material to prevent eddy current loss in areas where no conductors are present. By minimizing the eddy current loss in the rotor 12, it can be operated at lower temperatures, and radiation of heat to the superconducting magnet on the stator 10 is minimized.

Both the rotor 12 and the shaft 14 are made of 99 percent alumina. Armature slots 20 are cut axially about the periphery of the rotor 12. Small diameter copper wires 22 are placed in the armature slots 20 as shown in FIG. 2. These wires 22 provide a small rotor eddy current loss, and because these wires are paralleled in each slot 20 the effective resistance which yields the rotor copper loss is therefore also very low. By not having magnetic material present in the rotor 12 a larger cross section of copper armature conductors is utilized. To minimize the heat flow from the rotor 12 to the superconducting stator 10, a layer 24 of polished aluminum having a thickness of a few mils is plated on the alumina rotor 12. A very thin silver coating on the rotor surface will likewise reduce radiation.

The removal of rotor heat is a necessary function of the rotor 12 and the shaft 14. The material for the rotor and shaft should have a high thermal conductivity as well as a high strength to withstand the high rotor stresses encountered. As stated above, a high grade alumina has been found to be satisfactory for this purpose, and the rotor 12 and shaft 14 are fabricated from a single solid cylinder of this material. The alumina rotor and shaft provide a good heat path for cooling which may be done at the bearings 16 and 18. It is also contemplated that silicon oil can be circulated inside the shaft 14.

The magnetic field on the stator 10 is provided by coils 26 of a hard superconducting material which is niobium-tin. A silver, copper, or conductor coating is necessary to prevent current degradation of the magnet coil. It is also contemplated that gadolinium and holmium may be used as flux shaping materials. No outside back iron is necessary on the stator 10, and some of the magnetic field lines extend to infinity.

A housing 28 encloses the stator 10 as shown in FIGS. 1 and 2. The housing 28 includes insulating material 30 such as pearlite. A stainless steel jacket 32 supports the insulator 30. Stainless steel rods 34 extending from the housing 28 support the stator 10.

The main armature power is developed on the rotor 12 and is extracted on brushes 36. Ordinary graphite brushes 36 may be used in an enclosed section where an oil with a vapor pressure about $10^{-6}$ torrs is placed. At this pressure the high wearing rate of the brushes 36 does not occur. In the preferred embodiment rhenium brushes 36 slide on a silver commutator 38 or slip rings.

In operation, the shaft 14 is rotated in the bearings 16 and 18 by a hollow drive shaft 40 connected to a prime remover, such as the turbine. A coolant may be be circulated through the hollow shaft 40 to cool an aluminum cooling rod 42 because the rotor 12 operates at a temperature of about 300° K.

The superconducting magnet formed by the coils 26 must be continuously cooled by a cryogenic refrigerator 44. The cryogenic cooling fluid is circulated through insulated conduits to the coils as shown in FIG. 1. Another aluminum cooling rod 46 further aids in the cooling operation by cooling the end of the shaft 14.

While a preferred embodiment of the generator has been shown and described, various modifications may be made to the disclosed structure without departing from the spirit of the invention and the scope of the subjoined claims.

What is claimed is:
1. In a space power generating system of the type which converts rotating mechanical energy to electrical energy by moving an electrical conductor through a magnetic field, the improvement comprising
    a stator comprising stationary coils of a superconducting material,
    means for cryogenically cooling said material to superconducting temperatures whereby said coils form a superconducting magnet,
    a rotor comprising an armature having a plurality of axially extending slots about the periphery thereof, said rotor being of an electrically insulating material thereby minimizing eddy current loss,
    a plurality of parallel electrical conductors mounted in said slots, said conductors being small diameter copper wires for minimizing rotor eddy current loss,
    means for rotating said rotor whereby said conductors are moved through the field of said circuit conducting magnet, and
    a polished coating on said armature for minimizing heat flow from said rotor to said stator.
2. Apparatus as claimed in claim 1 including a housing for enclosing said stator for insulating the same.
3. Apparatus as claimed in claim 1 wherein the stator has a field above about 10 kilogauss.
4. Apparatus as claimed in claim 1 wherein the armature comprises an alumina rotor mounted on an alumina shaft supported by space bearings.
5. Apparatus as claimed in claim 1 wherein the polished coating is aluminum.
6. Apparatus as claimed in claim 1 wherein the polished coating is silver.
7. Apparatus as claimed in claim 1 including means for cooling the armature to a temperature below about 300° K.
8. Apparatus as claimed in claim 2 including a stainless steel jacket enclosing the housing.
9. Apparatus as claimed in claim 2 including a plurality of support rods extending inwardly from said housing to mount the stator.
10. Apparatus as claimed in claim 1 including means for removing electric power from the armature including a silver member mounted on the armature shaft, and
    stationary rhenium brushes in sliding contact with said member thereby enabling said generator to be used in a space environment.

References Cited

UNITED STATES PATENTS 3,242,418  3/1966  Mela et al. _____ 310—52
3,368,087  2/1968  Madsen _____ 310—52

MILTON O. HIRSHFIELD, *Primary Examiner.*

R. SKUDY, *Assistant Examiner.*